Dec. 20, 1927.

G. D. SAVAGE

CHALK LINE REEL AND AWL

Filed March 11, 1927

Inventor
Gardner D. Savage
By Attorneys

Dec. 20, 1927.
G. D. SAVAGE
1,653,191
CHALK LINE REEL AND AWL
Filed March 11, 1927     2 Sheets-Sheet 2
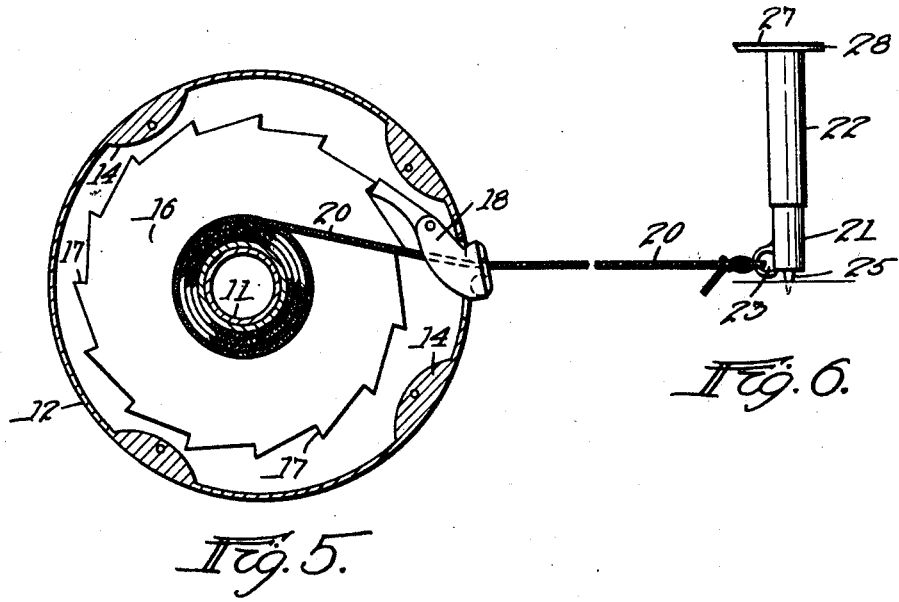
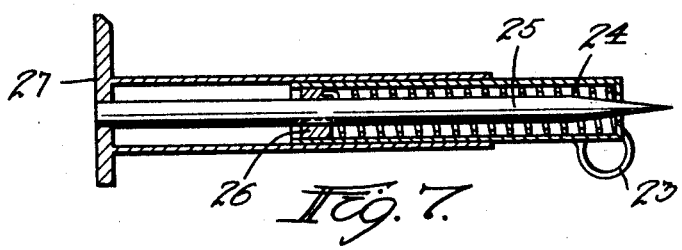
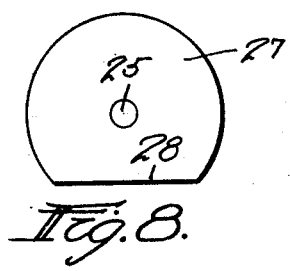
Inventor
Gardner D. Savage
By Attorneys Patented Dec. 20, 1927.

1,653,191

UNITED STATES PATENT OFFICE.

GARDNER D. SAVAGE, OF WEST BOYLSTON, MASSACHUSETTS.

CHALK-LINE REEL AND AWL.

Application filed March 11, 1927. Serial No. 174,647.

This invention relates to a chalk line reel and awl used by carpenters and other building mechanics.

The principal objects of this invention are to provide means for holding the spool from reeling out line at any point of its length when the reel is suspended by the line or the line is held in the hand; to provide an awl to hold the line close to the surface of the boarding when making chalk lines; to provide a socket in the edge of the case for holding the awl when not in use; and to provide a simple and inexpensive construction for accomplishing these purposes.

Reference is to be had to the accompanying drawings in which

Fig. 5 is a similar view showing the position of the parts when the line is pulled horizontally, the parts being in the same relative position when the reel depends, hanging on the line;

Fig. 6 is a side view of the awl shown attached to the line;

Fig. 7 is a central sectional enlarged view of the awl; and

Fig. 8 is an end view of the head of the awl.

Figures 1, 2:
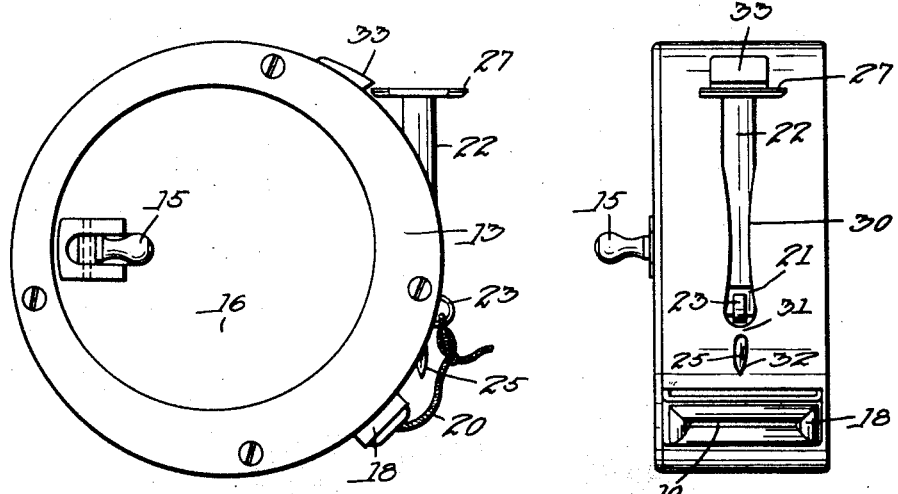
Fig. 1 is a face view of a chalk line reel constructed in accordance with this invention.
Fig. 2 is an edge view of the same.

In order to accomplish the above mentioned objects I construct the reel preferably in the form of a spool 10 adapted to rotate on a hollow stud 11 carried by a casing 12 and held in place by a cover 13 secured on the opposite side. The casing 12 comprises one flat side and a cylindrical edge wall to which the cover 13 is secured having projections 14 for that purpose.

Figures 3, 4:
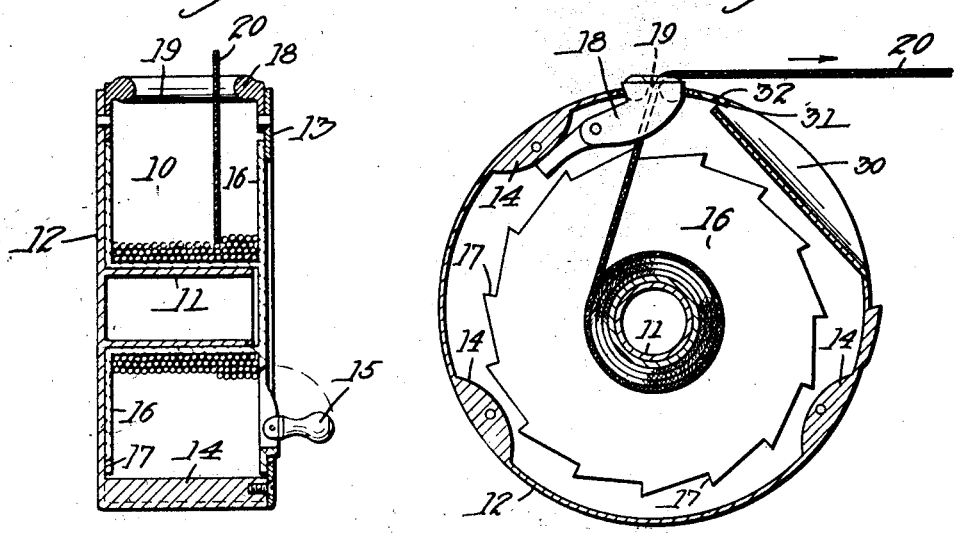
Fig. 3 is a diametrical sectional view thereof.
Fig. 4 is a sectional view on a plane parallel to the front as shown in Fig. 1 illustrating the position of the parts when unreeling the line.

The spool is provided with two circular discs or flanges 16 preferably integral with the center bearing thereof and on one of these is pivotally mounted a crank handle 15 adapted to lie flat in a recess in the disc 16, as shown in Fig. 1, when not in use. It can be turned out at right angles as shown in Figs. 2 and 3 to serve as a crank. It comes inside the circular opening in the cover 13.

The casing is shown as made eccentric with respect to the spool and its central stud, merely for the purpose of providing a space for the controlling means and the awl socket.

On the edge of one of the discs 16 there are teeth 17. Pivotally mounted on the casing there is a controlling pawl 18 the end of which is adapted to engage the teeth as shown in Fig. 5 for the purpose of preventing the unwinding of the line from the spool under certain conditions. This pawl has a wide slot 19 through which passes the line 20.

It will be obvious that by pulling the line out in the direction indicated in Fig. 4 the pawl 18 will be moved to the position shown in that figure and will not prevent the unreeling of the line, but when the line is pulled straight out in a radial direction as shown in Fig. 5 it will engage the opposite side of the slot 19 and swing the pawl around to engage one of the teeth 17. This will prevent the unwinding of the line from the spool as no motion can take place under those conditions. If the line is held in the hand and the reel allowed to depend therefrom the parts inside will assume the same relative position as shown in Fig. 5 so that the line will not be unreeled accidentally. The same thing can be done in a horizontal or any other position by swinging the whole reel relative to the line as will appear clearly from a comparison of Figs. 4 and 5.

The awl consists of a pair of telescoping tubes 21 and 22, the former having an eye 23 for attachment to the line. Also in the inner tube 21 is a spring 24 surrounding the awl pin 25 and adapted to be compressed between the inwardly flanged end of the tube 21, which has a hole in it for receiving the pin 25, and a plate 26 which is fixed on this pin 25. The tube 21 is adapted to slide in and out against the resistance of this spring. On the pin 25 is fixed a head 27. This head is of a circular shape with a segment cut off at 28. The tube 22 is secured to it or made integral with it as may be desired.

In use the awl, as indicated in Fig. 6, is stuck into a board or the like to hold the line.

The case is provided with a chordal cylindrical socket 30 for receiving the awl. This socket has a bridge 31 and a perforation 32 beyond it for receiving the point of the pin 25. It is also provided with a fixed abutment 33 behind which the head 27 of the awl can be held. This abutment is located with respect to the socket in such position that, when the tube 22 is placed in the socket and pressed up against the action of the spring, the head 27 can be received back of the abutment if the flat portion 28 is placed in horizontal position. Then the head can be turned as is shown in Figs. 1 and 2 to bring the circular part of the head behind the abutment and hold the awl detachably in position so that it can be carried by the reel. At this time the pin 25 projects through the perforation 32. This makes a compact arrangement in which the awl is held in position on the casing without projecting materially therefrom, and being held under spring pressure, it is not likely to become dislodged accidentally.

In fact it is necessary to turn the head around part way to permit it to be separated from the casing so that it is a very secure way to hold it. The socket 30 is lined with metal and projects into the casing but it comes at a point where the casing is spaced from the spool. The eccentricity of the casing is required for the purpose of providing this space and the space for the pawl 18.

From what has been said the way of using the reel will be understood readily and it will be seen that the above mentioned advantages are secured by this construction.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. In a chalk line reel the combination with a casing of cylindrical form with flat ends and with a circular opening in one end eccentrically located with respect to said end, of a spool located behind said circular opening and rotatable within the casing, a pivoted crank handle on the spool projecting through said opening, said spool having teeth around its circumference and a pawl having a slot through which a chalk line is adapted to pass and by which the line is adapted to be wound, said pawl being pivoted in said casing and having an end adapted to engage one of said teeth when the pawl is turned to one extreme position and to be spaced from said teeth in the other extreme position.

2. In a chalk line reel the combination with a casing, of a spool located within the casing, said spool having teeth around its circumference and a pawl having a slot through which a chalk line is adapted to pass pivoted in said casing and having an end adapted to engage one of said teeth when the pawl is turned to one extreme position and to be disengaged from said teeth in the other extreme position.

3. In a chalk line reel, the combination with a cylindrical casing, of a spool rotatable therein for receiving a chalk line, said spool having a series of teeth on its circumference, a pawl pivoted to the casing and having a slot for the line, the casing having a slot through its cylindrical wall for the outer end of the pawl, the pivot of the pawl being so located that, when the line is pulled from the casing in a direction at one side of a radial line through the slot, the pawl will be held away from the teeth and, when pulled toward the other side of said radial line, the pawl will be swung to engage the teeth and prevent the unwinding of the line.

4. In a chalk line reel, the combination with a casing and a spool inside, of a movable guide for a chalk line mounted on the casing and movable by the chalk line itself to two positions, means operated by the movement of said guides by which it positively prevents the unwinding of the line from the spool when the guide is in one position and in the other allows the spool to revolve and the line to unwind.

5. In a chalk line reel, the combination with a casing and a spool inside, of a movable guide for a chalk line mounted on the casing and movable by the chalk line itself to different positions, said casing having a socket in its circumferential wall, and an awl having means for connecting it with the end of the chalk line and adapted to be received in said socket.

6. In a chalk line reel, the combination with a casing, a spool therein on which a chalk line is adapted to be wound, said casing having a cylindrical socket located in the side of the reel, an awl having a cylindrical body adapted to be received in said socket and means for engaging the head of the awl to prevent its accidental removal.

7. The combination with a chalk line reel having a socket in its wall, of an awl for a chalk line comprising a pin and a head fixed thereto, the head having a general circular shape with a segmental part removed, the reel having an abutment so located that said head can be moved behind it when the segmental part is located parallel with its edge and then the head can be turned to hold the awl in position.

8. In an awl for a chalk line reel, the combination with a pair of telescoping tubes with a spring for normally holding them separated, the inner tube having means for attaching the chalk line thereto, the outer tube having a head thereon, and a pin fixed to the head and projecting beyond the end of the smaller tube.

In testimony whereof I have hereunto affixed my signature.

GARDNER D. SAVAGE.